I. UNGER.

CHILD'S CHAIR.

APPLICATION FILED AUG. 9, 1905.

12,879. Reissued Nov. 10, 1908.

Witnesses:

John Enders,

Chas. H. Buell

Inventor:

Isaac Unger,

By Dyrenforth, Dyrenforth & Lee,

Attys.

THE NORRIS PETERS CO., WASHINGTON, D. C.

UNITED STATES PATENT OFFICE.

ISAAC UNGER, OF IRON MOUNTAIN, MICHIGAN.

CHILD'S CHAIR.

No. 12,879. Specification of Reissued Letters Patent. Reissued Nov. 10, 1908.

Original No. 793,752, dated July 4, 1905, Serial No. 246,431. Application for reissue filed August 9, 1905. Serial No. 273,500.

*To all whom it may concern:*

Be it known that I, ISAAC UNGER, of Iron Mountain, Dickinson county, State of Michigan, have invented a new and useful Improvement in Children's Chairs, of which the following is a description, reference being had to the accompanying drawings, which are a part of this specification.

My invention relates particularly to improved means applied to a tray attachment for a child's chair in the nature of a guard for preventing a child while sitting in a high-chair from slipping down and forward out of the chair.

The present invention relates to an improvement on the device for which I recently made application, Serial No. 240,158, for an improvement in children's chairs for a similar purpose.

The object of the present invention is to provide a strong, neat and effective means for accomplishing the end desired, which means while being effective and especially neat and attractive in appearance is also adapted to be produced at a minimum of expense, and thereby at a reduction in cost to the user, both because of the inexpensiveness of the material employed and because of the facility with which the guard can be formed and attached to the tray with which it is employed. The invention consists of the device and its parts, as herein combined and claimed, or the equivalents thereof.

Figure 1:
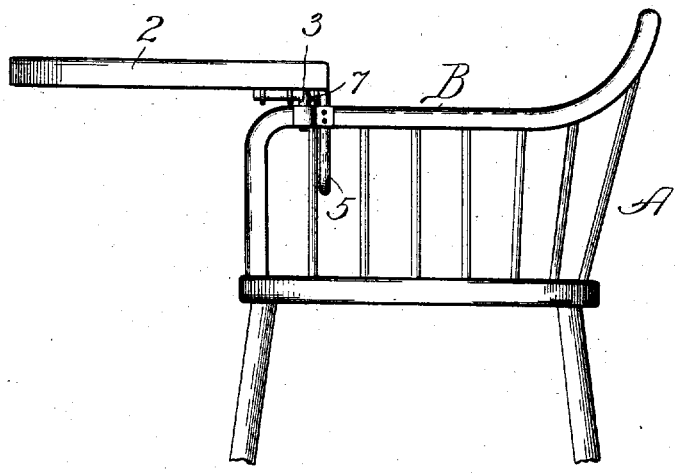
Figure 2:
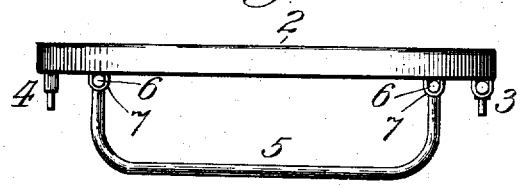
Figure 3:
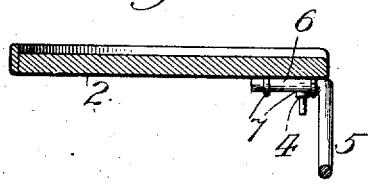
Figure 4:
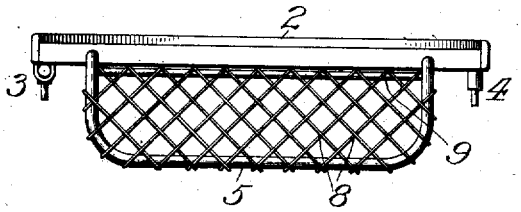
Figure 5:
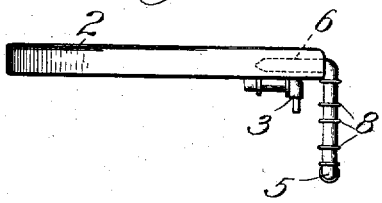

In the drawings, Figure 1 is a side view of the upper portion of a child's high chair with my improved device thereon. Fig. 2 is a front view of the tray with my improved guard thereon as made to be attached to the chair. Fig. 3 is a vertical section from front to rear centrally of the tray and guard. Fig. 4 is a view at the rear of the tray with a guard thereon, the guard having an additional feature and being secured to the tray in a slightly different way from the manner of attaching it as shown in Figs. 1, 2 and 3; and Fig. 5 is a side view of the tray and guard of Fig. 4.

In the drawings, A represents a child's chair of a well-known form having a back and side arms, including a rail B, extending from the front along at the sides and at the back. The form of the chair is not material to my invention, except that it must have side rails or arms, to which the tray and my improved guard can be attached.

The tray or table 2 is a detachable device which may be of any convenient size and form and may be adapted to be mounted on the chair by means of a hinge member 3, adapted to be inserted in a socket therefor in the rail B of the chair and may have a latch-pin 4 for connecting it detachably to the rail B at the other side of the chair. The means of attaching and securing the tray to the chair are not material to the present invention, and especially as this specific form of device has been shown and described in my former application for a patent, to which reference has been made, and as any means for securing the tray to the chair may be employed without reference to the present invention.

My improved guard consists chiefly of a single piece of metal, advisably a round rod or heavy wire of steel bent in such form as to be capable of being secured to the tray and to project downwardly therefrom medially a sufficient distance to serve efficiently as a guard to prevent the child when the tray is in position on the chair from slipping down and out of the chair under the guard. The wire or rod guard 5 is bent in a widened-U shape medially and has its upper ends bent and turned laterally, forming tangs, as shown at 6, which tangs being substantially at right angles to the vertical legs of the guard are adapted to be placed against the under surface of the tray 2 and to be secured thereto conveniently by staples 7, straddling the tangs and driven into the wood of the tray. Since the tray as ordinarily constructed and used projects forwardly from its attachment to the arms of the chair, the guard is ordinarily fastened to the tray at or near its rear edge. When thus made of steel wire, the guard is very light in weight, but strong and enduring in character and may be produced at a minimum of expense, while also it is entirely free from any splinters or liability to check, crack or split as a guard made of wood may do under the varying conditions of the atmosphere in which chairs and attachments thereto of this character are likely to be used.

In the form of construction shown in Figs. 4 and 5 a wire-netting 8 is added to the guard to close up in a general way the otherwise unfilled space between the legs of the guard. Such a netting may be made more attractive in appearance and will serve additionally to prevent the clothing of the child from getting over and protruding beyond the lower horizontal section of the guard. For most conveniently and securely attaching this wire-netting to the guard a cross-rod 9, fixed in or to the legs of the guard near the upper ends thereof, may be desirable. Also in Figs. 4 and 5 the tangs 6 of the guard are shown as driven into the wood of the tray 2, whereby the guard is fastened to the tray instead of being secured thereto by staples 7, as shown in Figs. 1, 2 and 3.

The particular form of the wire guard is not deemed essential to this invention, since the form may be varied to a certain extent without departing from the spirit of the invention, and the invention should be understood to include any form of wire or rod guard secured to and projecting downwardly from the tray, to which it must be attached to be of use in a device of this character. While it is preferred to make the guard of metal, for the reasons given above, this is not indispensable, as ratan or wicker rod would answer the purpose admirably, except that, in the modified construction of Figs. 4 and 5, it would not be possible to drive the tangs into the wood of the tray, without first providing holes for the purpose. The gist of the invention lies in a depending guard-body of bent rod lying in a plane at right angles to the tray, which latter is preferably of integral formation, said guard-body having an attaching base (at its upper part), formed preferably by bending the rod ends at an angle (forwardly at right angles to the legs) to afford a substantial connection with the tray and give rigidity to the guard.

What I claim as my invention is—

1. In a tray attachment for a child's chair, a shelf-like tray, and a wire guard in wide U-shape form secured to and depending from the tray at its rear edge and projecting downwardly therefrom medially a distance less than the distance from the tray to the seat of the chair.

2. In a tray attachment for a child's chair, a guard of steel wire in U form the extremities of its legs being bent and turned at right angles to the legs forming tangs by which the guard may be secured to the tray.

3. In a tray attachment for a child's chair, a guard of steel wire in U form, the extremities of its legs being bent and turned at right angles to the legs forming tangs by which the guard may be secured to the tray, and open-work wire filling on the guard between the legs thereof.

4. The combination with a chair having arms and a tray of integral construction spanning the space between said arms, of a depending guard of bent rod located beneath the rear portion of and extending from near one end to near the other end of the tray and having legs with bent extremities forming tangs which are firmly secured to the tray, for the purpose set forth.

ISAAC UNGER.

In presence of—
L. Heislar,
W. B. Davies.